US009349039B2

(12) United States Patent
Hanzawa et al.

(10) Patent No.: US 9,349,039 B2
(45) Date of Patent: May 24, 2016

(54) GESTURE RECOGNITION DEVICE AND CONTROL METHOD FOR THE SAME

(71) Applicant: OMRON Corporation, Kyoto (JP)

(72) Inventors: Yuki Hanzawa, Nara (JP); Takashi Ohta, Ritto (JP); Kazuya Urabe, Kusatsu (JP); Shun Sakai, Kusatsu (JP)

(73) Assignee: OMRON CORPORATION, Kyoto-shi (JP)

( * ) Notice: Subject to any disclaimer, the term of this patent is extended or adjusted under 35 U.S.C. 154(b) by 0 days.

(21) Appl. No.: 14/518,570

(22) Filed: Oct. 20, 2014

(65) Prior Publication Data

US 2015/0131855 A1 May 14, 2015

(30) Foreign Application Priority Data

Nov. 13, 2013 (JP) .................................. 2013-235115

(51) Int. Cl.
*G06K 9/00* (2006.01)
*G06F 3/01* (2006.01)
*G06F 3/03* (2006.01)

(52) U.S. Cl.
CPC ............ *G06K 9/00335* (2013.01); *G06F 3/017* (2013.01); *G06F 3/0304* (2013.01); *G06K 9/00288* (2013.01)

(58) Field of Classification Search
USPC ......................................................... 382/103
See application file for complete search history.

(56) References Cited

U.S. PATENT DOCUMENTS

| 8,971,572 | B1* | 3/2015 | Yin ..................... G06K 9/00355 345/173 |
| 2011/0158542 | A1* | 6/2011 | Kato ................... G06K 9/00281 382/195 |
| 2012/0114255 | A1 | 5/2012 | Kimura |
| 2012/0119985 | A1 | 5/2012 | Kang |
| 2012/0226981 | A1 | 9/2012 | Clavin |

FOREIGN PATENT DOCUMENTS

JP           4031255 B2    1/2008
KR  10-2012-0132921 A    12/2012

OTHER PUBLICATIONS

Extended European Search Report for Application No. 14189508.6 issued Jan. 5, 2015 (8 pages).

* cited by examiner

*Primary Examiner* — Yon Couso
(74) *Attorney, Agent, or Firm* — Nutter McClennen & Fish LLP; John J. Penny, Jr.

(57) ABSTRACT

A gesture recognition device configured to detect a gesture from acquired image and generate command issued to a control target instrument according to the gesture, the gesture recognition device comprising: an image acquisition unit configured to acquire an image; a gesture acquisition unit configured to detect a target region performing a gesture from the acquired image, and acquire the gesture based on motion or a shape of the detected target region; a face detection unit configured to detect a face comprised in the acquired image; a correlation unit configured to correlate the detected target region with the detected face using a human body model representing a shape of a human body; a personal identification unit configured to identify a user corresponding to the detected face; and a command generation unit configured to generate a command issued to the control target instrument based on the identified user and the acquired gesture.

6 Claims, 8 Drawing Sheets

FIG. 2A

Personal setting data

| User ID | User name | Feature amount |
|---|---|---|
| 0001 | Mr./Ms. A | ... |
| 0002 | Mr./Ms. B | ... |
| ... | ... | ... |

Personal setting data

| User ID | User name | Feature amount | Priority |
|---|---|---|---|
| 0001 | Mr./Ms. A | ... | 1 |
| 0002 | Mr./Ms. B | ... | 2 |
| ... | ... | ... | ... |

Gesture definition data

| User ID | Gesture | Command |
|---|---|---|
| 0001 | Move right hand in left direction | Turn down volume |
| 0001 | Move right hand in right direction | Turn up volume |
| 0001 | Move right hand in upward direction | Turn up channel |
| 0001 | Move right hand in downward direction | Turn down channel |
| 0001 | Clap hands | Turn on/ off power |
| 0001 | Raise one finger of right hand | Change to channel 1 |
| 0001 | Raise two fingers of right hand | Change to channel 2 |
| ... | ... | ... |
| 0001 | Turn hand so that palm is directed forward | Display television program |
| ... | ... | ... |
| 0002 | Move right hand in left direction | Turn up channel |
| 0002 | Move right hand in right direction | Turn down channel |
| 0002 | Move right hand in upward direction | Turn down volume |
| 0002 | Move right hand in downward direction | Turn up volume |
| 0002 | Raise one forefinger of right hand | Mute |
| 0002 | Turn hand so that palm is directed forward | Turn on/ off power |
| ... | ... | ... |

GESTURE RECOGNITION DEVICE AND CONTROL METHOD FOR THE SAME

CROSS-REFERENCE TO RELATED APPLICATION

This application is based on Japanese Patent Application No. 2013-235115 filed with the Japan Patent Office on Nov. 13, 2013, the entire contents of which are incorporated herein by reference.

FIELD

The present disclosure relates to a gesture recognition device that recognizes an input operation through a gesture.

BACKGROUND

There are signs that devices capable of providing an input to a computer or an electronic instrument through a gesture are becoming widespread.

For example, Japanese Patent No. 4031255 discloses an input device that captures an image of a gesture performed by a user within a space with a camera to convert the gesture into an input command. The input device stores a specific gesture and a specific input command and correlates the specific gesture and the specific input command with each other. The input device also includes a unit that recognizes the gesture and a unit that converts the recognized gesture into the input command. Therefore, the user can input any command without directly operating the input device just by performing a gesture operation in front of the electronic instrument.

In the input device that recognizes the gesture, sometimes an input command that varies according to a preference of the user is allocated to a certain gesture. For example, it is assumed that there is a user who wants to allocate an operation to "change a channel of a television set" to a gesture to "move a hand from side to side" and a user who wants to allocate an operation to "change a volume of the television set" to the gesture to "move the hand from side to side".

In order to deal with this situation, the input device of Japanese Patent No. 4031255 identifies a user who performs a gesture by detecting a face from an image captured by the camera. Therefore, the gesture and the input command can be correlated with each other for each user to perform customization suitable for individual preference.

However, in the input device of Japanese Patent No. 4031255, although a person can be identified by the face, which person performs the detected gesture cannot be correctly recognized in a case that a plurality of faces is taken in the image.

For example, it is assumed that a user A and a user B are present in front of a television set, and that an input device detects a gesture through a camera installed in a front surface of the television set. At this point, in a case that the users A and B allocate different commands to the gesture (for example, the user A allocates "turning up the channel" and the user B allocates "turning up the volume" to the gesture), because the input device cannot identify the user who performs the gesture, the input device cannot decide which command to perform.

SUMMARY

In accordance with one aspect of an example embodiment of the present disclosure, there is provided a gesture recognition device configured to detect a gesture from an acquired image and generate a command issued to a control target instrument according to the gesture, the gesture recognition device comprising: an image acquisition unit configured to acquire an image; a gesture acquisition unit configured to detect a target region performing a gesture from the acquired image, and acquire the gesture based on motion or a shape of the detected target region; a face detection unit configured to detect a face comprised in the acquired image; a correlation unit configured to correlate the detected target region with the detected face using a human body model representing a shape of a human body; a personal identification unit configured to identify a user corresponding to the detected face; and a command generation unit configured to generate a command issued to the control target instrument based on the identified user and the acquired gesture.

In accordance with another aspect of an example embodiment of the present disclosure, there is provided a method for controlling a gesture recognition device configured to detect a gesture from an acquired image and generate a command issued to a control target instrument according to the gesture, the method comprising: an image acquisition step for acquiring an image; a gesture acquisition step for detecting a target region performing a gesture from the acquired image, and acquiring the gesture based on motion or a shape of the detected target region; a face detection step for detecting a face comprised in the acquired image; a correlation step for correlating the detected target region with the detected face by applying a human body model to the acquired image; a personal identification step for identifying a user corresponding to the detected face; and a command generation step for generating a command issued to the control target instrument based on the identified user and the acquired gesture.

In accordance with yet another aspect of an example embodiment of the present disclosure, there is provided a non-transitory computer readable medium having stored thereon a gesture recognition program configured to cause a gesture recognition device to execute a plurality of steps, the gesture recognition device configured to detect a gesture from an acquired image and generate a command issued to a control target instrument according to the gesture, the plurality of steps comprising: an image acquisition step for acquiring an image; a gesture acquisition step for detecting a target region performing a gesture from the acquired image, and acquiring the gesture based on motion or a shape of the detected target region; a face detection step for detecting a face comprised in the acquired image; a correlation step for correlating the detected target region with the detected face by applying a human body model to the acquired image; a personal identification step for identifying a user corresponding to the detected face; and a command generation step for generating a command issued to the control target instrument based on the identified user and the acquired gesture.

BRIEF DESCRIPTION OF THE DRAWINGS

FIGS. 2A and 2B are tables illustrating examples of personal setting data;

FIG. 3 is a table illustrating an example of gesture definition data;

DETAILED DESCRIPTION

First Embodiment

System Configuration

Figure 1:
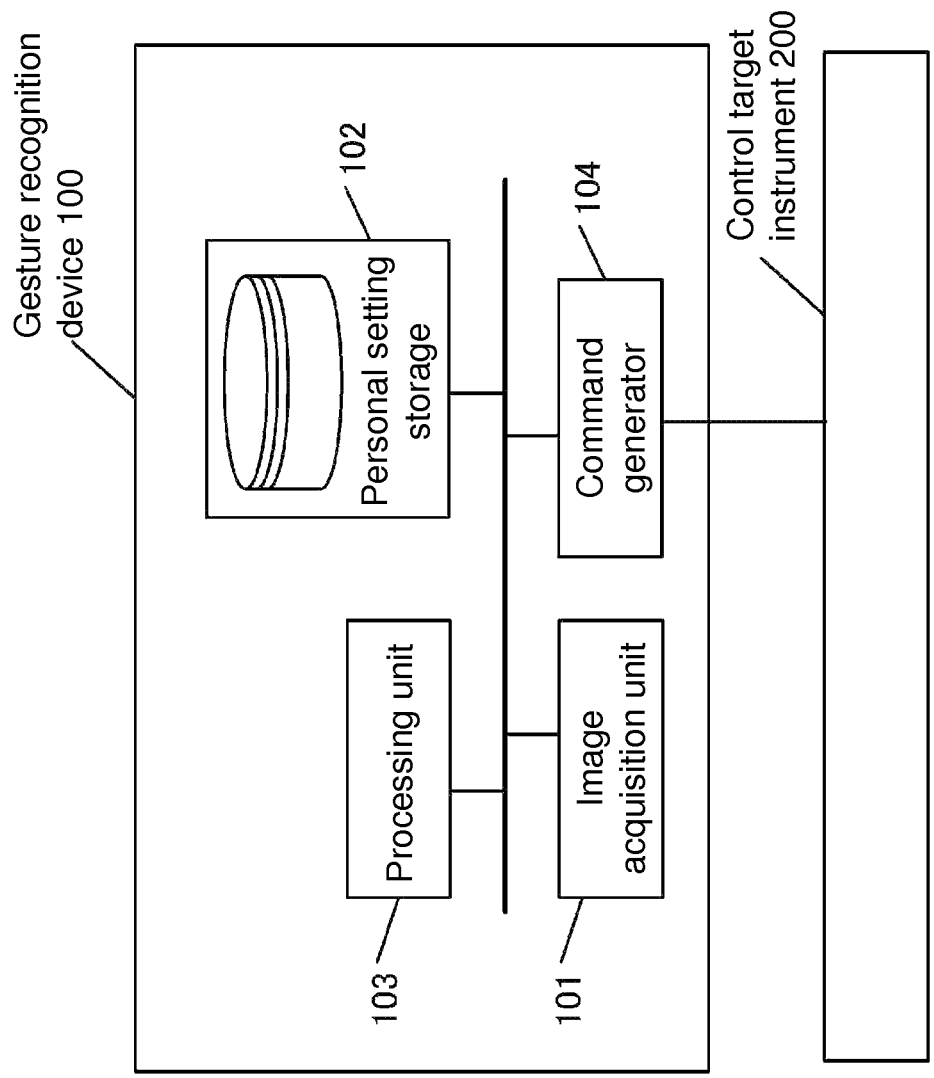
FIG. 1 is a view illustrating a configuration of a gesture recognition system according to a first embodiment.

An outline of a gesture recognition system according to a first embodiment will be described below with reference to FIG. 1, which illustrates a system configuration. The gesture recognition system of the first embodiment includes a gesture recognition device 100 and a control target instrument 200.

The gesture recognition device 100 recognizes a gesture performed by a user with a camera, identifies the user who performs the gesture, generates a command corresponding to the user and gesture, and transmits the command to the control target instrument 200.

The control target instrument 200 receives the command from the gesture recognition device 100. Typically, the control target instrument 200 is an electric product such as a television set, a video recorder, a computer, an air conditioner, and a television conference system. The control target instrument 200 may be any instrument as long as the instrument can receive the command from the gesture recognition device 100 via wired means or wirelessly.

In the first embodiment, it is assumed that the control target instrument 200 is a television set, and that the gesture recognition device 100 is a device incorporated in the television set.

The gesture recognition device 100 will be described in detail below.

The gesture recognition device 100 includes an image acquisition unit 101, a personal setting storage 102, a processing unit 103, and a command generator 104.

The image acquisition unit 101 acquires an image from an external source. In the first embodiment, the image of the user is captured with the camera (not illustrated) installed on a top of a front surface of a television screen. In the image acquisition unit 101, the camera may be either a camera that acquires an RGB image or a camera that acquires a grayscale image or an infrared image. The image may not necessarily be acquired with the camera. An image (distance image) showing a distance distribution generated by a distance sensor may also be used. Alternatively, a combination of the distance sensor and the camera may be used.

The image acquired by the image acquisition unit 101 may be any image as long as the gesture performed by the user and a face (specifically, face feature amount) of the user can be acquired. An angle of view of the acquired image may be substantially equal to a viewing angle of the television set.

The personal setting storage 102 stores information identifying the user of the gesture recognition device 100. As used herein, the information identifying the user of the gesture recognition device 100 means information used to determine a person based on the acquired face image, for example, a numerical face feature amount.

The personal setting storage 102 stores a content of the gesture and the command corresponding to the gesture with respect to each user. For example, for a certain user, the "gesture moving an opened right hand in a right direction" and the command for "turning up a volume" are stored in the personal setting storage 102 and are correlated with each other.

In the first embodiment, the information identifying the user is referred to as "personal setting data", and information in which correlation between the gesture and the command is defined is referred to as "gesture definition data". FIG. 2A illustrates an example of the personal setting data in the first embodiment, and FIG. 3 illustrates an example of the gesture definition data.

Both the pieces of data are associated by a user ID that is a user identifier.

The processing unit 103 acquires the gesture based on the image acquired by the image acquisition unit 101, and identifies the person who performs the gesture based on the personal setting data stored in the personal setting storage 102. The processing unit 103 also decides the command to be generated based on the gesture definition data stored in the personal setting storage 102. An operation of the processing unit 103 is described in detail later.

The command generator 104 generates the command decided by the processing unit 103. The command is a signal used to control the control target instrument 200. For example, the command may be an electrical signal, a wireless modulated signal, or a pulse-modulated infrared signal.

The gesture recognition device 100 is a computer including a processor (not illustrated), a main storage device (not illustrated), and an auxiliary storage device (not illustrated). A program stored in the auxiliary storage device is loaded in the main storage device and executed by the processor to operate the functions of each unit in FIG. 1.

<Processing for Correlating Gesture and Person with Each Other>

Processing performed by the processing unit 103 will be described in detail below.

Figure 4:
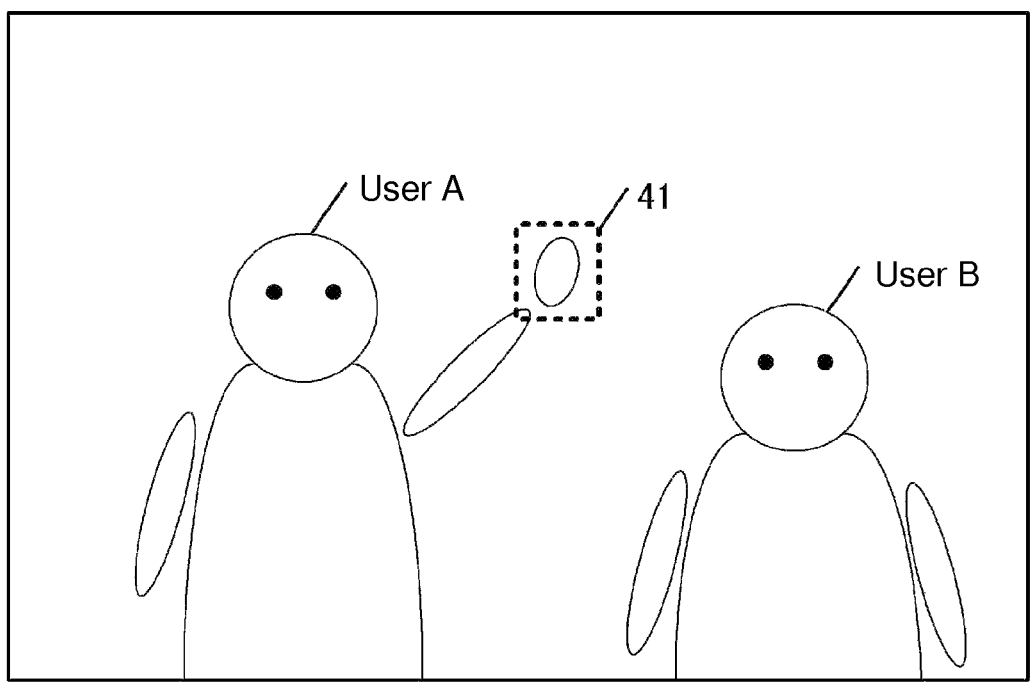
FIG. 4 is a view illustrating gesture recognition processing.

FIG. 4 illustrates an example of the image acquired by the image acquisition unit 101. That is, FIG. 4 is a view illustrating users who directly face the television screen when the users are viewed from the screen. At this point, it is assumed that a user A and a user B exist in front of the television set.

A gesture is extracted from the image by detecting a region (hereinafter referred to as a target region) of where the gesture is performed. In the first embodiment, it is assumed that the user performs the gesture using a hand. For example, the processing unit 103 detects an area 41 showing the hand of a human from the image, and tracks motion of the hand, thereby extracting the gesture expressed by the motion of the hand. The gesture expressed by a shape of fingers is extracted by acquiring a shape of the target region.

For example, the detection of the target region and the extraction of the gesture can be performed by a method for detecting a feature point and for comparing the feature point with a previously-stored model, as described in JP 2000-149025 A. Because other well-known technologies can be used, the description of the detailed method is omitted.

Examples of the extractable gestures include "indicating a direction by moving a whole hand", "drawing a graphic", "raising a finger", and "moving a finger". In the case that a marker is used, different operations may be highlighted by the type (color or shape) of the marker.

Conventionally, a person who performs a gesture can be identified by detecting a face in an image. However, which person is correlated with the detected target region (that is, the hand of the user A or the hand of the user B) is hard to determine in the case that a plurality of persons exist in the image. Accordingly, the command to be generated cannot be specifically decided in the case that different commands are defined for each person with respect to the gesture.

In order to solve the problem, it is necessary to perform processing to correlate the detected target region and the detected face with each other. Therefore, the processing unit 103 of the first embodiment stores a model (hereinafter referred to as a human body model) representing a shape of a human body, and correlating the detected target region and the detected face with each other using the human body model.

Figure 5:
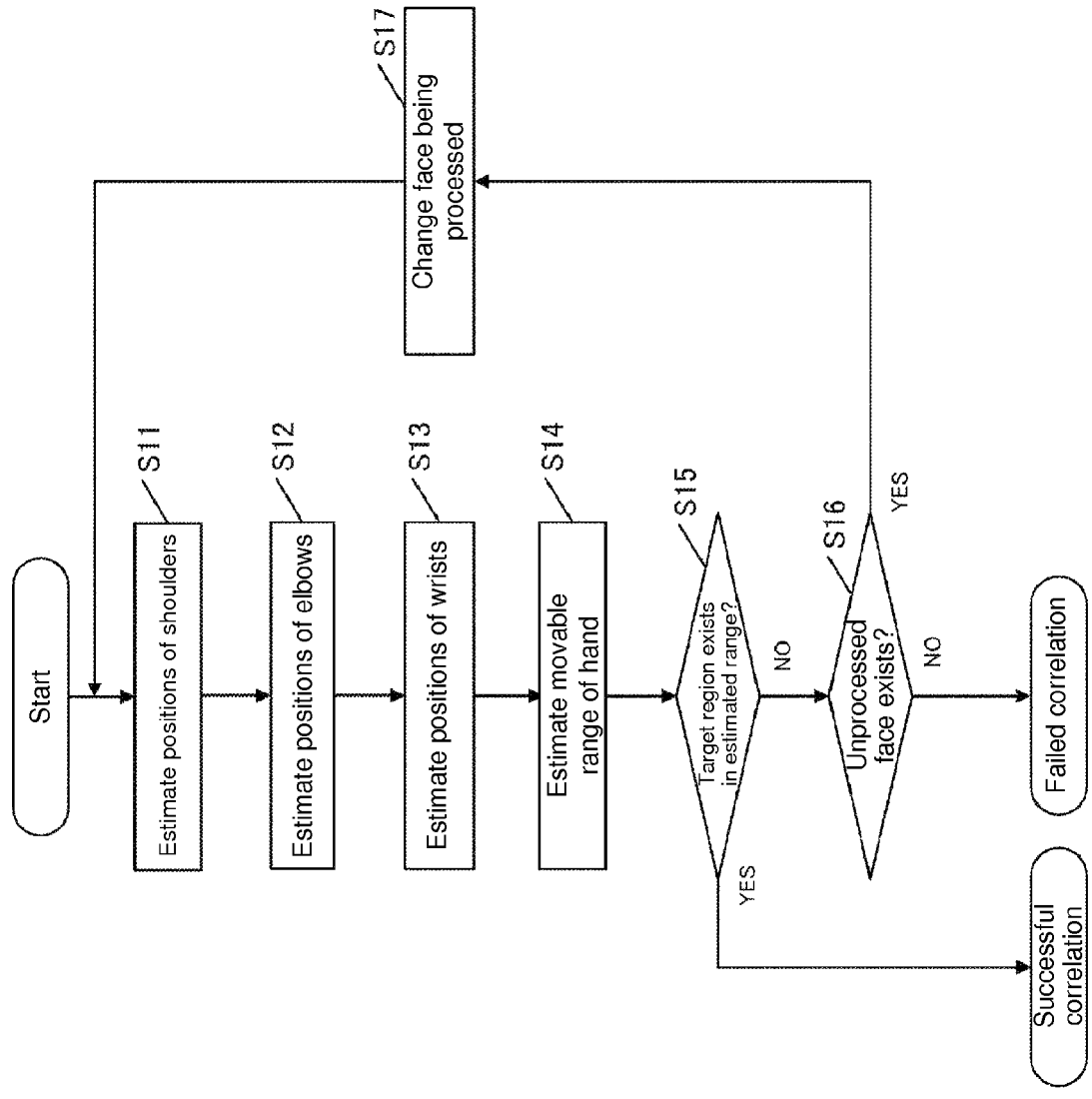
FIG. 5 is a flowchart illustrating correlation processing in the first embodiment.

An example of the correlation will be described below. FIG. 5 is a flowchart illustrating an example of the correlation processing that is performed by the processing unit 103 using the human body model. At this point, it is assumed that acquisition of an image, detection of a face, detection of a target region, and extraction of a gesture are already completed.

Firstly, based on a position of a detected face, positions of shoulders of a user are estimated from the image using the human body model (Step S11).

Secondly, positions of elbows are estimated based on the estimated positions of the shoulders (Step S12).

Thereafter, positions of wrists are estimated based on estimated positions of the elbows (Step S13).

Furthermore, movable range of hands is estimated based on the estimated positions of the wrists (Step S14).

Thereafter, whether the detected target region exists within the estimated movable range of the hands is determined (Step S15). If the target region exists, a determination that the target region is to be correlated with the detected face is made. On the other hand, when the target region does not exist, the flow goes to Step S16 to determine whether an unprocessed face is present in the image. If an unprocessed face exists, the face being processed is changed (Step S17) to process the unprocessed face, and the processing in Step S11 is repeated.

If the unprocessed face does not exist, a determination that the target region and the face cannot be correlated with each other is made.

For example, a method for estimating the position of the shoulder, the elbow, and the wrist based on the human body model is described in "T. H. Yu, T-K. Kim, and R. Cipolla, "Unconstrained Monocular 3D Human Pose Estimation by Action Detection and Cross-modality Regression Forest", Proc. of IEEE Conf. on Computer Vision and Pattern Recognition (CVPR), Portland, Oreg., USA, 2013". In the first embodiment, correlation of a target region and a face is determined through the process illustrated in FIG. 5. The correlation may be performed based on data defining shape of a human body, or another technique may be adopted.

Figure 6:
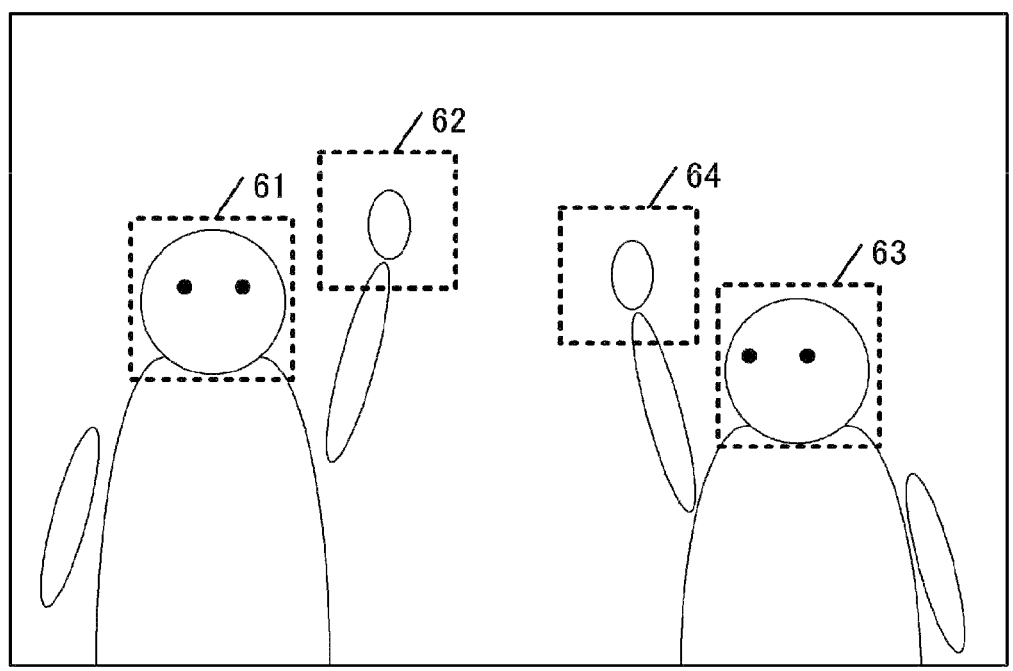
FIG. 6 is a view illustrating an example of an image acquired by an image acquisition unit in the first embodiment.

FIG. 6 is a view illustrating result of correlation between a face and a target region. For example, a hand corresponding to a face 61 exists in an area 62, and a hand corresponding to a face 63 exists in an area 64.

The gesture recognition device 100 of the first embodiment can correlate a region where a gesture is performed with a face of a person who performs the gesture by performing the above-mentioned processing.

<Entire Processing>

Figure 7:
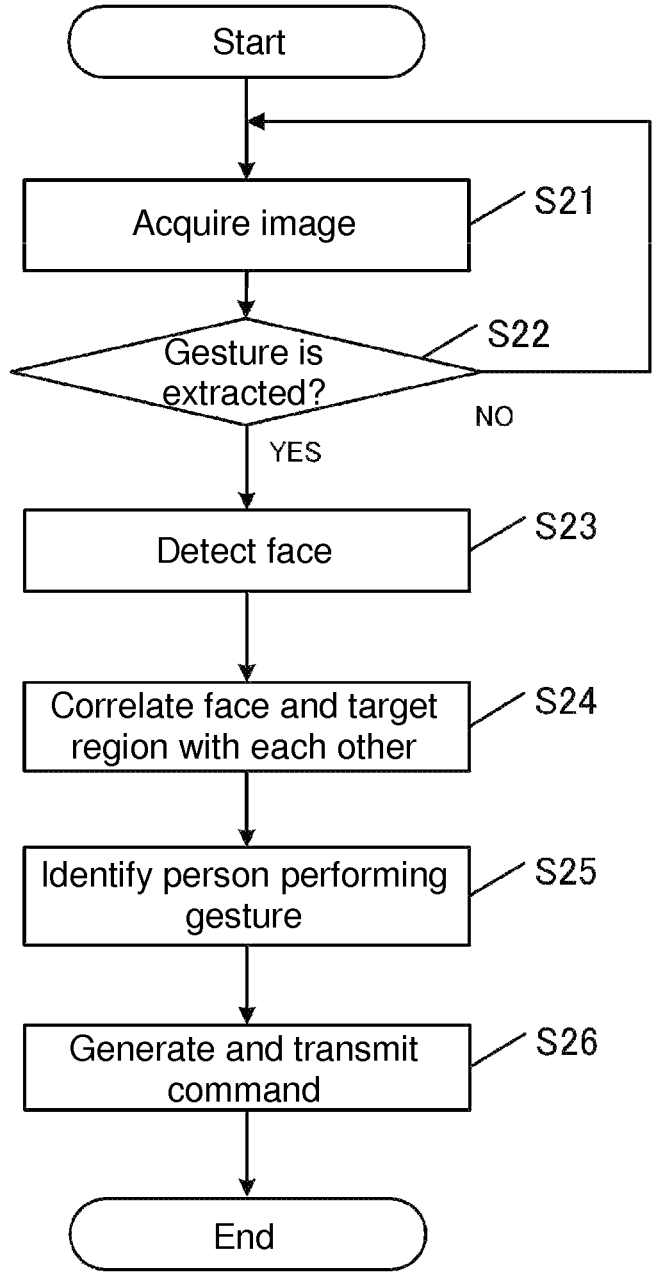
FIG. 7 is a flowchart illustrating processing of a gesture recognition device in the first embodiment.

The entire processing performed by the gesture recognition device 100 of the first embodiment will be described with reference to FIG. 7 illustrating a process flowchart.

The image acquisition unit 101 acquires an image from a camera (not illustrated) (Step S21).

In Step S21, for example, an RGB color image is acquired from a camera installed on top of a front surface of a television screen.

The processing unit 103 tries to detect a target region and extract a gesture from the acquired image (Step S22). For example, in the event that the gesture definition data in FIG. 3 is stored, a gesture of "raising one finger" and a position of a hand performing the gesture are temporarily stored and correlated with each other. When a gesture is not extracted, the flowchart returns to Step S21 to acquire an image again.

In the first embodiment, for convenience sake, it is assumed that one gesture is extracted from one image. Alternatively, a plurality of images may continuously be acquired to extract a gesture of a motion. In this case, in Step S22, the images of a plurality of frames may temporarily be accumulated until a gesture of a motion is detected.

The processing unit 103 detects all faces present in the acquired image (Step S23). Specifically, a coordinate of a detected face in the image and a feature amount of the detected face are acquired.

The processing unit 103 performs processing in Steps S11 to S17 to correlate the detected face and a detected target region of where the detected gesture is performed with each other (Step S24).

In the first embodiment, it is assumed that the correlation is performed using one image. However, in the case that images of a plurality of frames are acquired, the correlation may be performed with respect to each of the plurality of frames. For example, a correlation failure may be determined in the case that a ratio of the frames that cannot be correlated is greater than or equal to a predetermined value.

The processing unit 103 determines which user has its face detected in Step S23, and identifies the person who performs the gesture using processing results of Steps S22 and S24 (Step S25).

Specifically, a personal setting data stored in the personal setting storage 102 is referred to, and compared to the feature amount of the detected face to acquire a user ID corresponding to the face. The user ID of the person who performs the gesture is identified using information on the "gesture performed in the target region" acquired in Step S22 and information on the "target region corresponding to the detected face" acquired in Step S24. For example, it is determined that the user having the user ID "0001" performs the gesture of "raising one finger".

In Step S26, the command generator 104 refers to the gesture definition data stored in the personal setting storage 102, generates a corresponding control signal, and transmits the control signal to the control target instrument 200. In the example of FIG. 3, the command generator 104 generates a control signal for a command of "changing a channel to 1", and transmits the control signal to the control target instrument 200.

According to the first embodiment, the target region performing the gesture and the face are correlated with each other based on the human body model, so that whoever performs the detected gesture can be accurately identified. Therefore, even if the gesture is customized for each user in the case that a plurality of persons exists in an image, the user can still perform the desired input operation correctly.

A default command correlated with each of the plurality of gestures may be stored, and the default command may be generated in the case that a gesture recognition device fails to identify a person in Step S25. Alternatively, no command may be generated in the case that the gesture recognition device fails to identify the person in Step S25. Alternatively, a signal indicating an error that a user cannot be identified may be transmitted to the control target instrument 200.

In the first embodiment, one person performs one gesture but in the case that a plurality of gestures are detected in Step S22 when a plurality of faces are detected in Step S23, correlation of each of the plurality of gestures and each of the plurality of faces with each other may be attempted. As a result, in situations when a plurality of correlations are obtained, it means that the gestures are simultaneously performed by a plurality of persons, hence the processing in Steps S24 to S26 may be repeated a plurality of times corresponding to the number of detected faces.

It is not always necessary to perform the steps in FIG. 7 in order. For example, processing of any step may be performed in parallel with processing of another step.

Modification of First Embodiment

In the first embodiment, the target region where the gesture is performed and the face are correlated with each other using the human body model. In the case that the correlation can be performed without performing the processing in Step S24 (that is, processing in Steps S11 to S17), the processing in Step S24 may be eliminated.

For example, in the case that at least two persons exist in the image, and in the case that it is determined that the correlation can be performed based on the coordinates and sizes of the detected face and the target region without performing the processing in Step S24, the correlation will be performed without performing the processing in Step S24. The same holds true for the case that only one face is detected in the image.

Therefore, processing time can be shortened, and waiting time of the user can be decreased during gesture input.

Second Embodiment

In a second embodiment, a command is generated according to priority defined for each user in the case that a plurality of persons in an image simultaneously perform gestures. Configuration of a gesture recognition device according to the second embodiment differs from that of the first embodiment as shown in the following description.

In the second embodiment, the priority is added to personal setting data stored in the personal setting storage 102 as illustrated in FIG. 2B. With reference to FIG. 7, which is partially applicable to the second embodiment, in the case that the processing unit 103 determines that at least two persons simultaneously perform the gestures in S25, the priority for the users is acquired in Step S26 of FIG. 7. However, the processing of a gesture performed by a user having relatively low priority is not performed. For example, in the case that a user having a user ID "0001" and a user having a user ID "0002" simultaneously perform gestures, the command generation processing is not performed for a gesture performed by the user having the low-priority user ID "0002".

According to the second embodiment, a collision between operations can be prevented by giving priority to each user.

The priority may be determined only in the case that contents competing with each other are simultaneously inputted, for example, in the case that an instruction to turn up volume and an instruction to turn down the volume are simultaneously issued.

Furthermore, priority may be given not to the user but the command, and a command having low priority may not to be generated. For example, higher priority may be given to power operation than volume operation.

Third Embodiment

In a third embodiment, in the case that the gesture recognition device fails to correlate a face and a target region in an image with each other, a user who performs a gesture is estimated to be generating a command. Configuration of the gesture recognition device according to the third embodiment differs from that of the first embodiment as shown in the following description.

Figure 8:
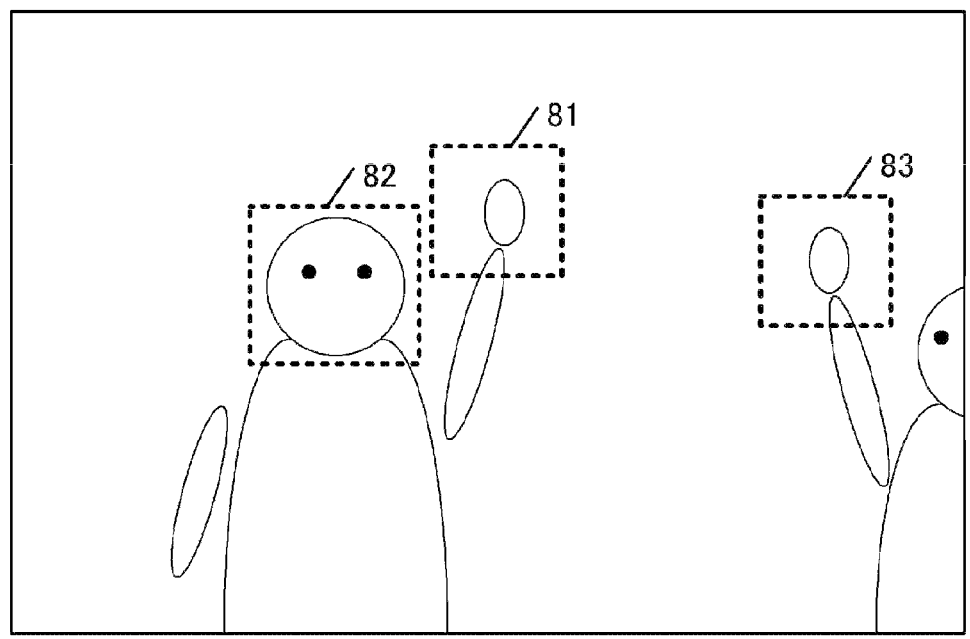
FIG. 8 is a view illustrating an example of an image acquired by an image acquisition unit in a third embodiment.

For example, FIG. 8 illustrates two persons in an image individually performing gestures. Although two detected target regions 81 and 83 exist, correlation cannot be performed in the target region 83 in the first and second embodiments because only one face 82 is detected.

Therefore, in the third embodiment, with reference to FIG. 7, which is partially applicable to the third embodiment, in the case that the gesture recognition device fails in the correlation in Step S24, the user is estimated by performing the following processing instead of Step S25. Estimation of a user refers to identifying which user performs a gesture.

A first method is one in which an image acquired previously is used. For the usage of the first method, the processing unit 103 retains the image acquired in Step S21 for a certain period, and the user is estimated by referring to the retained image. For example, in the case that a person is leaves the frame of a captured image immediately before a gesture is detected, the target region in which the gesture recognition device fails in the correlation can be estimated to be the target region of the person.

A second method is one in which history data is used. For example, in generating the command in Step S26, the processing unit 103 generates and retains an operation history, and a user is estimated by referring to the operation history. For example, in the case that the user daily operates an instrument around a prevailing time, the target region in which the gesture recognition device fails in the correlation can be estimated to be the target region of the user.

A third method is one in which the determination is made by referring to personal setting data. For example, in the case that n users are registered in the personal setting data, that n target regions are detected from an image, and that (n−1) faces are detected, there is a possibility that the target region in which the gesture recognition device fails in the correlation is the target region of the person whose face is not detected in the n registered users.

Therefore, whether the target region in which the gesture recognition device fails in the correlation is the target region of the person whose face is not detected in the n registered users may be checked by identifying the face based on the data acquired in Step S23. That is, in the case that only the face of one person fails to be identified by the gesture recognition device to be present in the n registered users, the target region in which the gesture recognition device fails in the correlation can be estimated to be the target region of the person.

Additionally, in the case that information for estimating a user can be acquired externally, the user may be estimated using such information. For example, in the case that a viewing history of a television set can be acquired for each user, the user may be estimated using the viewing history.

In the case that the gesture recognition device fails to estimate the user, similar to the first embodiment, a default command may be generated, or a command may not to be generated. In the case that the user is estimated, a signal indicating that the estimation is performed may be transmitted to the control target instrument 200. Therefore, the user can be notified that the user is estimated.

Modifications

The first to third embodiments are described only by way of example, a change or a combination of the first to third embodiments can be made without departing from the scope of the disclosure.

For example, in the first to third embodiments, the gesture recognition device 100 is incorporated in the control target instrument 200. Alternatively, the gesture recognition device 100 may be independent from the control target instrument 200.

The gesture recognition device 100 may be mounted as a program running on the control target instrument 200. In the case that the gesture recognition device 100 is mounted as the program, the program stored in the memory may be configured so as to be performed by the processor, or the program may be configured so as to be performed by an FPGA (Field Programmable Gate Array) or an ASIC (Application Specific Integrated Circuit).

In the first to third embodiments, the image is acquired with a camera. Alternatively, as long as the gesture can be acquired and the face of the user can be identified, the image may be acquired by a method other than the method in which the image is acquired with the camera, for example, a method for receiving the image through a network.

The human body model used by the processing unit 103 may be data mathematically representing positional relationship of face, shoulder, elbow, wrist, and the like, or a skeleton model as long as the human body model is data representing the shape of the human body. Alternatively, the data used may be image data used for performing model matching.

An object of an embodiment according to the present disclosure is to provide a gesture recognition device that can correctly acquire gesture input customized for each user even if a plurality of users exists around one user performing the gesture input.

In order to solve problems in existing prior art, a gesture recognition device of the present disclosure may have a configuration such that a human body model representing a shape of a human body is used, a face of a user in an image and a target region in which a gesture is performed by the user are correlated with each other to identify the person performing the gesture.

Specifically, according to one aspect of an embodiment of the present disclosure, there is provided a gesture recognition device configured to detect a gesture from an acquired image and generate a command issued to a control target instrument according to the gesture, the gesture recognition device includes: an image acquisition unit configured to acquire an image; a gesture acquisition unit configured to detect a target region performing a gesture from the acquired image, and acquire the gesture based on motion or a shape of the detected target region; a face detection unit configured to detect a face present in the acquired image; a correlation unit configured to correlate the detected target region with the detected face using a human body model representing a shape of a human body; a personal identification unit configured to identify a user corresponding to the detected face; and a command generation unit configured to generate a command issued to the control target instrument based on the identified user and the acquired gesture.

The gesture recognition device of the disclosure may detect the target region in which the gesture is performed and the face of the user, and correlate the target region and the face with each other, thereby identifying the user performing the gesture. As used herein, the target region means a region in which a user performs a gesture, typically, using hands of a human. The target region may be a gesture input marker.

The correlation between the target region and the face is performed using a human body model, which is a model representing shape of a human body. That is, the correlation is performed only in the case that a natural positional relationship exists between the detected face and the target region, but the correlation is not performed for an unnatural positional relationship. The correlation may be performed by any method as long as a human body model is used. For example, a position such as a human body, an arm, an elbow, and a wrist can be estimated with the detected face as a starting point, a movable range of a hand can be calculated based on an estimation result, and whether the target region is present in the movable range may be determined.

The human body model is not necessarily a model only representing the shape of the human body. For example, in the case that an input is performed using a gesture input marker, a model representing a shape including the gesture input marker may be used. The human body model may be a model including the shape of a tool used to perform the gesture.

Therefore, the target region can be associated with the user, and the person who performs the gesture can be accurately identified even if a plurality of persons is present in the image.

The gesture recognition device may further include a gesture storage unit configured to store personal setting data, a set of a gesture and a command issued to the control target instrument being correlated with each user in the personal setting data. In this regard, the command generation unit may generate the command issued to the control target instrument based on the personal setting data.

Thus, the gesture and the command corresponding to the gesture are preferably stored and correlated to each user.

The correlation unit may calculate a range where the target region is estimated to exist in each detected face using a coordinate of the detected face and the human body model, and the correlation unit may correlate the target region and the face with each other when the target region exists in the calculated range.

The human body model is applied to each detected face to calculate the range where the target region is estimated to exist, which allows the detected face and the target region to be accurately correlated with each other.

The gesture storage unit may further store priority correlated with a user therein, and the command generation unit may process a gesture corresponding to a user having higher priority when the gesture acquisition unit simultaneously acquires at least two gestures.

In the gesture recognition device of an embodiment of the present disclosure, although a person performing a gesture can be identified, sometimes the command to be generated is hard to determine in the case that a plurality of persons simultaneously perform gestures. In order to deal with such cases, priority is defined for each user and processing may be performed according to the priority. For example, the gesture performed by the user having higher priority may be processed in advance of a gesture performed by another user, or a gesture performed by a user having lower priority may not be processed.

The command generation unit may generate a default command corresponding to a gesture without considering a user performing the gesture when the correlation unit fails to correlate the detected target region and the detected face with each other.

Thus, the default input command that is not associated with a specific user may be generated in the case that the correlation unit fails to correlate the target region and the face with each other.

The gesture recognition device of an embodiment of the present disclosure may further include a user estimation unit configured to estimate which user performs a gesture without use of a face detection result. In this regard, the user estimation unit may estimate the user performing the gesture when the correlation unit fails to correlate the detected target region and the detected face with each other.

The person may be estimated based on an image acquired previously, or the person may be estimated by acquiring information from another unit. For example, a user may be estimated to perform a gesture from an image acquired previously in the case that the user is estimated to exist near an instrument. In the case that a control target instrument is a television set and viewing history of the television set can be acquired for each user, the user performing the gesture may be estimated based on the viewing history.

Furthermore, an embodiment according to the present disclosure can be regarded as including at least some of the aforementioned units of the gesture recognition device. An embodiment according to the present disclosure can also be a method for controlling the gesture recognition device, a program causing the gesture recognition device to operate, and a recording medium in which the program is recorded. The features of the processing steps of the method and the program, and the units can freely be combined as long as technical inconsistency is not created.

Accordingly, embodiments according to the present disclosure can provide a gesture recognition device that correctly acquires gesture input customized for each user even if a plurality of users exists around a user performing the gesture input.

The invention claimed is:

1. A gesture recognition device configured to detect a gesture from an acquired image and generate a command issued to a control target instrument according to the gesture, the gesture recognition device being controlled by a processing unit or control target instrument to operate as:
    an image acquisition unit configured to acquire an image;
    a gesture acquisition unit configured to detect a target region performing a gesture from the acquired image and acquire the gesture based on motion or a shape of the detected target region;
    a face detection unit configured to detect a face comprised in the acquired image;
    a correlation unit configured to correlate the detected target region with the detected face using a human body model representing a shape of a human body;
    a personal identification unit configured to identify a user corresponding to the detected face;
    a command generation unit configured to generate a command issued to the control target instrument based on the identified user and the acquired gesture; and
    a gesture storage unit configured to store personal setting data, a set of a gesture and a command issued to the control target instrument being correlated with each user in the personal setting data;
    wherein:
        the command generation unit is configured to generate the command issued to the control target instrument based on the personal setting data;
        the correlation unit is configured to calculate a range where the target region is estimated to exist for each detected face using a coordinate of the detected face and the human body model and correlate the target region and the face with each other when the target region exists in the calculated range; and
        the personal identification unit is configured to identify the user through acquiring a user identifier corresponding to the face correlated with the target region by comparing feature amount of the correlated face with the personal setting data.

2. The gesture recognition device according to claim 1, wherein:
    the gesture storage unit is further configured to store priority correlated with a user therein, and
    the command generation unit is configured to process a gesture corresponding to a user having higher priority when the gesture acquisition unit simultaneously acquires at least two gestures.

3. The gesture recognition device according to claim 1, wherein the command generation unit is configured to generate a default command corresponding to a gesture without considering a user performing the gesture when the correlation unit fails to correlate the detected target region and the detected face with each other.

4. The gesture recognition device according to claim 1, wherein the gesture recognition device being controlled by the processing unit or control target instrument is configured to operate as:
    a user estimation unit configured to estimate which user performs the gesture without use of a face detection result, wherein the user estimation unit is configured to estimate the user performing the gesture when the correlation unit fails to correlate the detected target region and the detected face with each other.

5. A method for controlling a gesture recognition device configured to detect a gesture from an acquired image and generate a command issued to a control target instrument according to the gesture, the method comprising:
    acquiring an image;
    detecting a target region performing a gesture from the acquired image and acquiring the gesture based on motion or a shape of the detected target region;
    detecting a face comprised in the acquired image;
    correlating the detected target region with the detected face by applying a human body model to the acquired image;
    identifying a user corresponding to the detected face;
    a command generation step for generating a command issued to the control target instrument based on the identified user and the acquired gesture;
    storing personal setting data, a set of a gesture and a command issued to the control target instrument being correlated with each user in the personal setting data; and
    wherein the method further includes:
        generating the command issued to the control target instrument based on the personal setting data;
        calculating a range where the target region is estimated to exist for each detected face using a coordinate of the detected face and the human body model;
        correlating the target region and the face with each other when the target region exists in the calculated range; and
        identifying the user through acquiring a user identifier corresponding to the face correlated with the target region by comparing feature amount of the correlated face with the personal setting data.

6. A non-transitory computer readable medium having stored thereon a gesture recognition program configured to cause a gesture recognition device, configured to detect a gesture from an acquired image and generate a command issued to a control target instrument according to the gesture, to:
    acquire an image;
    detect a target region performing a gesture from the acquired image and the gesture based on motion or a shape of the detected target region;
    detect a face comprised in the acquired image;

correlate the detected target region with the detected face by applying a human body model to the acquired image;
identify a user corresponding to the detected face;
generate a command issued to the control target instrument based on the identified user and the acquired gesture; and
store personal setting data, a set of a gesture and a command issued to the control target instrument being correlated with each user in the personal setting data:
wherein the gesture recognition program configured to cause a gesture recognition device to:
  generate the command issued to the control target instrument based on the personal setting data;
  calculate a range where the target region is estimated to exist for each detected face using a coordinate of the detected face and the human body model;
  correlate the target region and the face with each other when the target region exists in the calculated range; and
  identify the user through acquiring a user identifier corresponding to the face correlated with the target region by comparing feature amount of the correlated face with the personal setting data.

* * * * *